No. 664,591. Patented Dec. 25, 1900.
D. E. SOUTHWICK.
DEVICE FOR FEEDING AND WATERING POULTRY.
(Application filed Apr. 3, 1900.)
(No Model.) 2 Sheets—Sheet 1.

Witnesses D. E. Southwick, Inventor
By his Attorneys,

No. 664,591. Patented Dec. 25, 1900.
D. E. SOUTHWICK.
DEVICE FOR FEEDING AND WATERING POULTRY.
(Application filed Apr. 3, 1900.)
(No Model.) 2 Sheets—Sheet 2.

D. E. Southwick, Inventor.
Witnesses
By his Attorneys.

UNITED STATES PATENT OFFICE.

DAVID E. SOUTHWICK, OF OGDENSBURG, NEW YORK.

DEVICE FOR FEEDING AND WATERING POULTRY.

SPECIFICATION forming part of Letters Patent No. 664,591, dated December 25, 1900.

Application filed April 3, 1900. Serial No. 11,373. (No model.)

*To all whom it may concern:*

Be it known that I, DAVID E. SOUTHWICK, a citizen of the United States, residing at Ogdensburg, in the county of St. Lawrence and State of New York, have invented a new and useful Device for Feeding and Watering Poultry, of which the following is a specification.

The invention relates to improvements in devices for feeding and watering poultry.

One object of the present invention is to improve the construction of devices for feeding and watering poultry and to provide a simple, inexpensive, and efficient one which will be strong and durable and adapted for supplying food and water to various kinds of poultry, birds, and the like and capable of preventing the same from fouling the contents of the receptacle and from roosting on it.

A further object of the invention is to provide a device of this character which will afford convenient access to the receptacles for supplying the same with food and water and for removing any food or water remaining unconsumed.

The invention consists in the construction and novel combination and arrangement of parts hereinafter fully described, illustrated in the accompanying drawings, and pointed out in the claims hereto appended.

Figure 1:
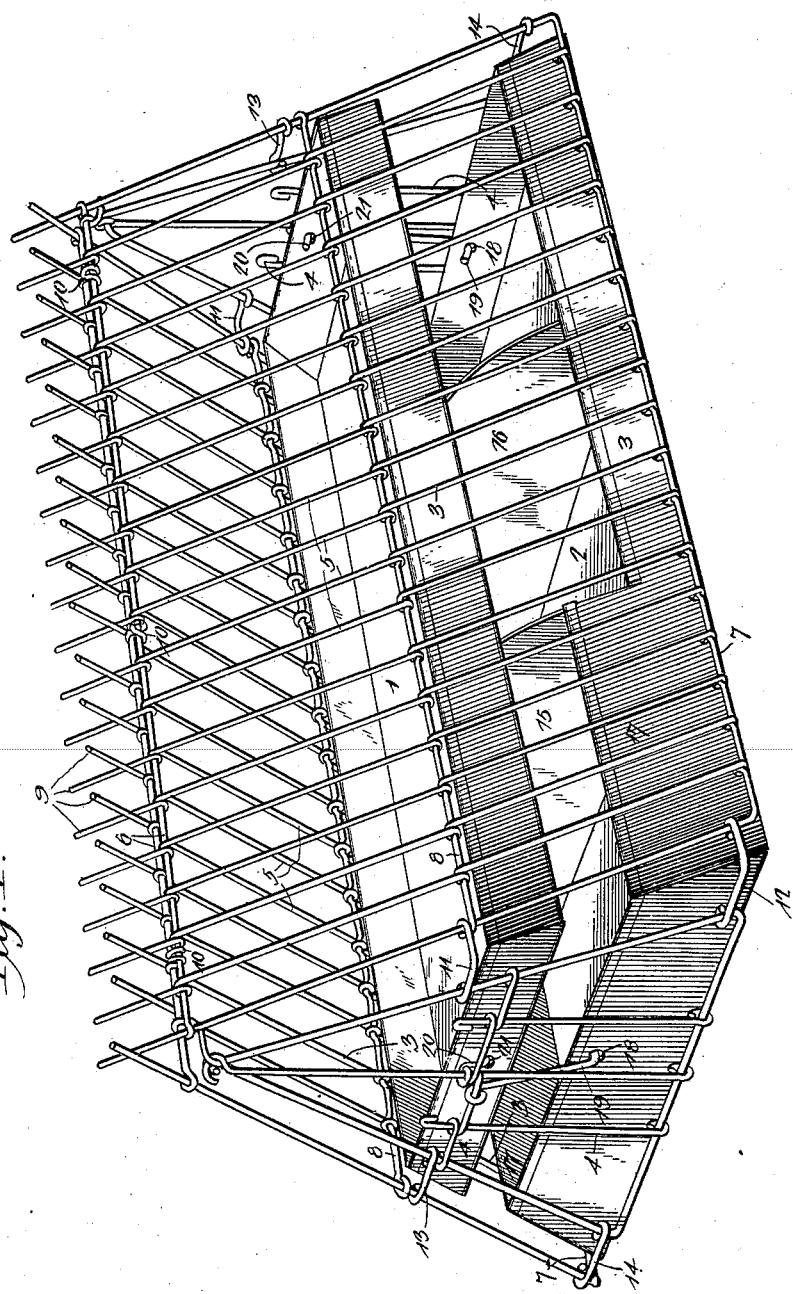
Figure 2:
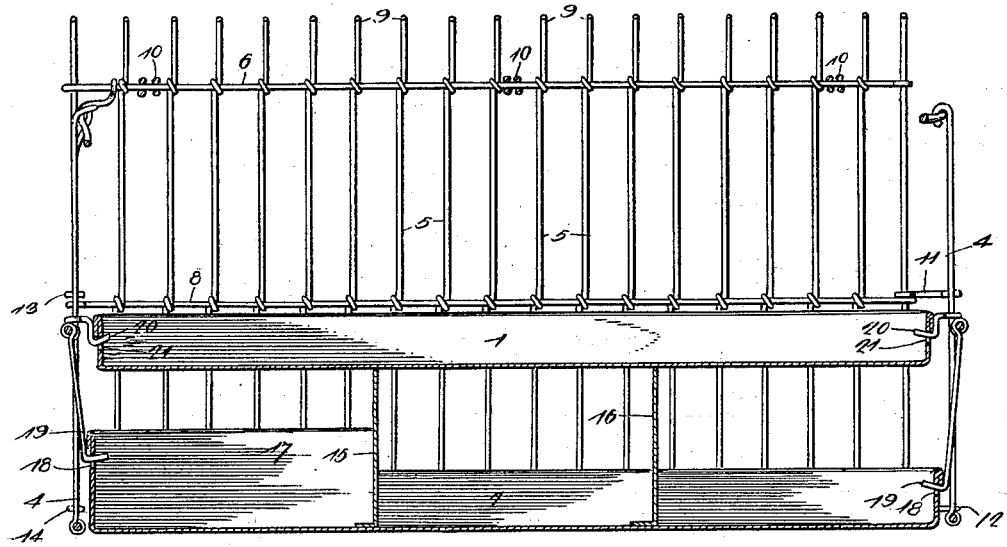
Figure 3:
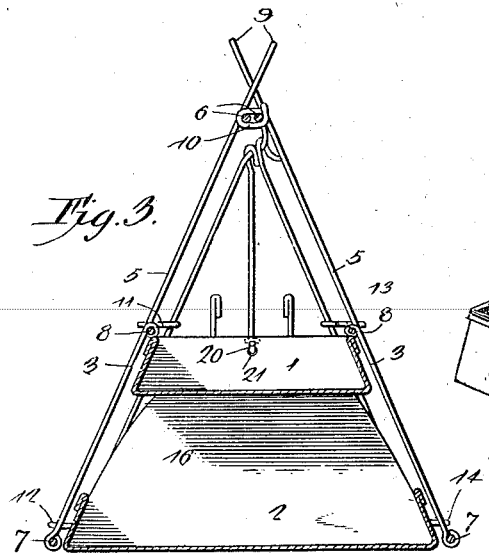
Figure 4:
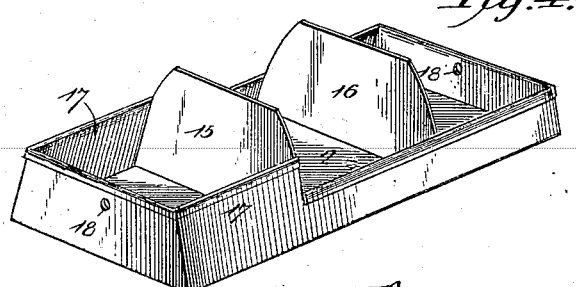
Figure 5:
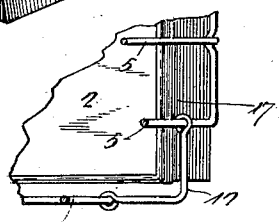

In the drawings, Figure 1 is a perspective view of a poultry feeding and watering device constructed in accordance with this invention. Fig. 2 is a longitudinal sectional view of the same. Fig. 3 is a transverse sectional view. Fig. 4 is a perspective view of the lower receptacle. Fig. 5 is a detail sectional view illustrating the manner of connecting the sides and ends of the wire inclosure or guard.

Like numerals of reference designate corresponding parts in all the figures of the drawings.

1 and 2 designate upper and lower receptacles arranged within a tapering inclosure or guard composed of inwardly-inclined sides 3 and substantially triangular ends 4 and extending around the sides and the ends of the said receptacle. The inclosure or shield, which is adapted to prevent poultry from getting into the receptacles and soiling and spoiling the contents thereof, is provided with openings to permit the poultry to have free access to the receptacles to feed and to obtain water.

The sides 3, which are preferably constructed of stout wire, are composed of upright wires 5, connected by horizontal wires 6, 7, and 8, arranged at the top and bottom of the inclosure or shield and at an intermediate point; but this open-work structure may be constructed in any other suitable manner, if desired. The top horizontal wires are located near the upper ends 9 of the wires 5, and the projecting upper ends 9 form prongs or spurs to prevent fowls from roosting upon the device, and the projections or prongs of one side of the shield or inclosure extend through the intervals or spaces between the prongs or projections of the other side of the inclosure. The top horizontal wires are connected at intervals by suitable ties 10, of wire, which hinge the sides together, so that either side may be swung upward when it is disconnected from the ends 4 to obtain access to the receptacles. The lower wires are preferably formed integral with the end upright wires, and the latter and the intermediate upright wires may be connected with the horizontal wires by any suitable means, such as by coiling the wires around one another, as shown.

The triangular ends 4 of the guard or inclosure are secured at their apexes to the top horizontal or ridge wires, and they are connected at the bottom and at an intermediate point by corner-hooks 11 and 12, which are substantially L-shaped, and by straight hooks 13 and 14. The straight hooks connect the wires which are arranged in substantially the same transverse plane, and the L-shaped hooks connect the end wires, which are arranged at different points along the device. This construction is necessitated by the alternate arrangement of the upright wires. When either side is released by disengaging the hooks, it may be swung upward, as will be readily understood.

The lower receptacle, which is provided with walls or flanges, has its side walls inclined and arranged at the same inclination as the sides of the inclosure or guard, and it is divided into separate compartments by transverse partitions 15 and 16, preferably located equidistant of the ends of the receptacle and extended vertically to support the upper receptacle. The compartments, which may be of any desired number, are designed to contain water, gravel, comminuted oystershells, and the like, and the walls 17 at one end of the lower receptacle are preferably extended, as shown. The ends of the lower receptacle are provided with perforations 18, which are engaged by depending hooks 19, hinged to the ends of the guard or inclosure near the centers thereof and adapted to be readily swung inward and outward to engage and release the lower receptacle, and when the hooks 19 are disengaged from the lower receptacle the guard or inclosure may be readily lifted therefrom.

The upper receptacle 1, which is designed to contain the food and which is supported upon the partitions 15 and 16, is secured at its ends to the guard or inclosure by hooks 20, which engage perforations 21 in the ends of the receptacle.

The invention has the following advantages: The device, which is simple and comparatively inexpensive in construction and which may be made of any suitable material, is adapted for supplying food and water to poultry, birds, and the like, and it is capable of protecting its contents and of preventing the same from being soiled by the poultry or birds feeding. It is adapted to prevent poultry and birds from entering the receptacle or roosting on it, and it affords free access to the contents of the receptacle. The sides of the guard or inclosure are hinged together at the top and are detachably connected with the ends, and either side may be swung upward.

Changes in the form, proportion, size, and the minor details of construction within the scope of the appended claims may be resorted to without departing from the spirit or sacrificing any of the advantages of this invention, such as varying the means for connecting the guard or inclosure to the receptacles and omitting one of the latter when desired.

What is claimed is—

1. A device of the class described comprising a guard or inclosure composed of substantially triangular ends, and inclined sides and having prongs or projections at the apex formed by the sides, one of the sides being hinged at such apex, and the upper and lower receptacles arranged within the guard or inclosure, substantially as described.

2. A device of the class described comprising a guard or inclosure provided with ends and having an inclined side, upper and lower receptacles arranged within the guard or inclosure, and fastening devices detachably securing the receptacles to the guard or inclosure, substantially as described.

3. A device of the class described comprising a guard or inclosure composed of substantially triangular ends, and inclined sides, a lower receptacle arranged at the bottom of the guard or inclosure and provided with partitions extending above its walls, an upper receptacle supported upon the said partitions, and fastening devices detachably securing the receptacles to the guard or inclosure, substantially as described.

In testimony that I claim the foregoing as my own I have hereto affixed my signature in the presence of two witnesses.

DAVID E. SOUTHWICK.

Witnesses:
NATHANIEL WELLS,
JNO. F. WELLS.